United States Patent Office 3,081,304
Patented Mar. 12, 1963

3,081,304
AMINO HYDROXY NITRILES
Edgar R. Rogier, Hopkins, Minn., assignor to General Mills, Inc., a corporation of Delaware
No Drawing. Filed Oct. 29, 1959, Ser. No. 849,440
21 Claims. (Cl. 260—247.7)

The present invention relates to the novel amino hydroxy higher alkylnitriles and their substituted amino derivatives.

These compounds may be used for a large number of purposes such as plasticizers for polyvinyl resins, sludge inhibiting additives for fuel oils and the like. In addition, these amino hydroxy higher alkylnitriles serve as valuable intermediates in the production of novel hydroxy polyamines.

The novel compounds of the present invention are those amino hydroxy higher alkylnitriles which have the formula RCN in which R is an aliphatic hydrocarbon group containing 8–24 carbon atoms and has attached to each carbon atom of at least one pair of adjacent carbon atoms different groups selected from the class consisting of

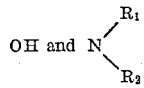

where $R_1$ and $R_2$ are members selected from the class consisting of (1) hydrogen, (2) aliphatic groups, (3) aryl groups, (4) hydroxy alkyl groups and (5) where

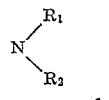

is part of a heterocyclic group such as

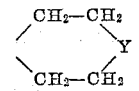

where Y=O, N, or S.

The compounds of the present invention are conveniently prepared by the reaction of the higher alkyl epoxy nitriles with ammonia or a primary or secondary amine to introduce a hydroxyl group on one of the epoxy carbon atoms and an amino group on the other. The epoxy rings may be split on either side of the oxygen bonds so that either the hydroxyl group or amino group may be attached to either of the carbon atoms of the original epoxy group. Accordingly the reaction product may contain both isomeric forms of the compounds as illustrated by the following formulas which represent the compounds obtained when 9,10-epoxystearonitrile is reacted with ammonia,

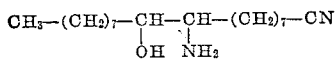

and

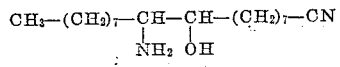

A wide variety of N-substituted amino hydroxy higher alkylnitriles may be prepared from an equally wide variety of primary and secondary amines by splitting the oxygen bond as described. Such compounds as ethylene diamines, diethylene triamines or other polyamines, morpholines, ethanolamine, diethanolamine, amino phenols, substituted and unsubstituted alkyl and aryl amines are only examples of the many varieties of reactants that can be used.

The epoxy higher alkyl nitriles to be used in preparing the compounds of the present invention may be conveniently prepared by the reaction of perbenzoic or peracetic acid with an unsaturated fatty nitrile.

Those unsaturated fatty nitriles prepared by the reaction of ammonia and an unsaturated fatty acid, such as oleic, erucic, eleostearic, linoleic, linolenic, clupanodonic, palmitoleic and palmitolenic acid form convenient starting materials for preparing epoxy nitriles which contain an even number of carbon atoms. Whereas, those unsaturated fatty nitriles which are prepared by the reaction of an unsaturated alkyl halide and an inorganic cyanide form convenient starting materials for preparing epoxy nitriles which contain an odd number of carbon atoms.

The unsaturated fatty acids previously referred to occur naturally in animal and vegetable fats and oils such as soybean, safflower, cottonseed, rapeseed, linseed, and sardine oils and the like. Whereas, the previously mentioned unsaturated alkyl halides may be prepared by converting one of the aforementioned fatty acids to an alcohol and reacting that alcohol with a halogen acid to form the alkyl halide.

The present invention is further illustrated by the following examples.

Example I

An autoclave was charged with 250 g. of 9,10-epoxystearonitrile (percent oxirane oxygen=4.7), 125 g. of methanol and 166 g. of anhydrous ammonia. The reaction mixture was agitated and heated at 130–135° C. for 9 hours at 750 p.s.i.g. pressure. A yield of 259 g. of crude product having an amine number of 151 was obtained.

The above crude product was purified by removal of neutral impurities as follows:

247 g. of above crude amine was dissolved in 3 liters of methanol and passed through a 1500 ml. column of a sulfonic acid ion exchange resin in the acid form. The following fractions were obtained:

| Fract. No. | Eluent Type | Vol., gallon | Wt. of Solvent free effluent, g. | Amine No. |
|---|---|---|---|---|
| 1 | methanol | 1 | 31 | 0 |
| 2 | do | 0.8 | 6 | 0 |
| 3 | methanol-ammonia (4%) | 2 | 208 | 176 |
| 4 | do | 1 | 1 | |
| Total | | | 246 | |

A portion of the amine fraction (3) from the above exchange column purification was distilled under reduced pressure. Thus, 199 g. of the 9(10)-amino-10(9)-hydroxystearonitrile (amine number 176) was distilled at 183–188° C. (at about 0.2 mm. Hg). 163 g. of 9(10)-amino-10(9)-hydroxystearonitrile with an amine number of 186 was obtained (theoretical calculated for $$C_{18}H_3ON_2$$

is 189).

Example II

The procedure of Example I was repeated, except that the reactants were 100 g. of dimethylamine and 202 g. of 9,10-epoxystearonitrile (percent oxirane oxygen=4.65). The reaction mixture was agitated and heated at 140–150° C. for 17.5 hours at 750 p.s.i.g. pressure.

A 70% yield based on weight yield of amine fraction and oxirane content of crude 9,10-epoxystearonitrile of 9(10)-dimethylamino-10(9)-hydroxystearonitrile was obtained which after being purified as described in Example I had an amine number of 169 (calculated amine number for $C_{20}H_{40}ON_2$ is 173).

Example III

To 691 g. of 9,10-epoxystearonitrile (percent oxirane oxygen=4.65) in a flask was added 740 g. of n-dodecylamine (amine number 303) and 124 g. of ethylene glycol. The mixture was then reacted for 8.8 hours at 150° C.

A 92% yield as based on the weight yield of the amine fraction and the oxirane content of 9,10-epoxystearonitrile of 9(10)-dodecylamino-10(9)-hydroxystearonitrile was obtained, which after being purified as described in Example I had an amine number of 120 (calculated amine number for $C_{30}H_{60}ON_2$ is 121).

*Example IV*

To 800 g. of 9,10-epoxystearonitrile (percent oxirane oxygen=4.65) in a flask was added 1080 g. of aniline and 140 g. of ethylene glycol. The mixture was then heated for 14.5 hours at 150° C.

An 87% yield as based on weight yield of amine fraction and oxirane content of crude 9,10-epoxystearonitrile of 9(10)-anilino-10(9)-hydroxystearonitrile was obtained which after being purified as described in Example I had an amine number of 148 (calculated amine number for $C_{24}H_{40}ON_2$ is 151).

*Example V*

To 1054 g. of 9,10-epoxystearonitrile (percent oxirane oxygen=4.65) in a flask was added 530 g. of morpholine and 186 g. of ethylene glycol. The mixture was then heated for 12 hours at 150° C.

A 95% yield based on weight yield of amine fraction and oxirane content of crude 9,10-epoxystearonitrile of 9(10)-morpholino-10(9)-hydroxystearonitrile was obtained which after being purified as described in Example I had an amine number of 155 (calculated amine number for $C_{22}H_{42}O_2N_2$ is 153).

*Example VI*

To 688 g. of 9,10-epoxystearonitrile in a flask was added 600 g. of ethylene diamine and 148 g. of n-butanol. The mixture was then treated at 122° C. for 18 hours.

A 93% yield based on weight yield of amine fraction and oxirane content of 9,10-epoxystearonitrile of 9(10)-(β-aminoethyl)-amino - 10(9)-hydroxystearonitrile was obtained which after being purified as described in Example I had an amine number of 317 (calculated amine number for $C_{20}H_{41}ON_3$ is 330).

*Example VII*

To 800 g. of 9,10-epoxystearonitrile in a flask was added 490 g. of diethanolamine, 100 ml. of the monobutyl ether of ethylene glycol. The mixture was heated at 150° C. for 7 hours.

A 100% yield based on weight yield of amine fraction and oxirane content of crude 9,10-epoxystearonitrile of 9(10)-diethanolamino-10(9)-hydroxystearonitrile was obtained which after being purified as described in Example I had an amine number of 158 (calculated amine number for $C_{22}H_{44}O_3N_2$ is 146).

*Example VIII*

To 1043 g. of 9,10-epoxystearonitrile (percent oxirane oxygen=4.57) in a flask was added 1224 g. of meta-xylylene diamine. The mixture then was heated at 150° C. for 24 hours.

The 9(10)-meta-aminomethyl benzylamino-10(9)-hydroxystearonitrile obtained after being purified and distilled as described in Example I had an amine number of 271 (calculated amine number for $C_{26}H_{45}ON_3$ is 270).

*Example IX*

The procedure of Example I was repeated using 350 g. of 9,10-epoxystearonitrile (percent oxygen=4.57), 144 g. of methylamine, and 100 ml. of methanol the reactants. The reaction mixture was then heated at 150° C. for 4 hours.

A 95% yield, based on weight yield of the amine fraction and oxirane content of 9,10-epoxystearonitrile of 9(10)-methylamino-10(9)-hydroxystearonitrile was obtained which after being purified and distilled as in Example I had an amine number of 182 (calculated amine number for $C_{19}H_{38}ON_2$ is 181).

*Example X*

To 1052 g. of 9,10-epoxystearonitrile (percent oxirane oxygen=4.57) in a flask was added 650 g. of metaphenylene diamine and 175 g. of ethylene glycol. The mixture then was reacted at 150° C. for 11½ hours.

The 9(10)-meta-aminophenylamino - 10(9)-hydroxystearonitrile obtained after being purified and distilled as described in Example I had an amine number of 284 (calculated amine number for $C_{24}H_{41}ON_3$ is 290).

To determine the effectiveness of the above-described compounds as inhibitors for corrosion of ferrous metals by water containing hydrogen sulfide, the following tests in which controls were likewise prepared were conducted. Measured amounts of the compounds to be tested were added to one liter flasks, each containing 100 ml. of kerosene. The flasks were filled with deaerated water containing 5% sodium chloride and 500 parts per million of hydrogen sulfied. Tared mild steel 16 gauge coupons, one inch square were suspended on glass hooks and lowered into the water phases in the flasks. The oxygen free flasks were then sealed and stored under static conditions at ambient temperatures for 7 days. The panels were then removed from the flasks, dipped in dilute inhibited hydrochloric acid, rubbed to remove scale, then rinsed in distilled water, dried, weighed and compared to the controls.

The testing indicated that the compounds of Examples II–IX were effective at concentrations of 25–50 parts per million as based on total liquid present, while the 9(10)-amino-10(9)-hydroxystearonitrile proved to be an effective corrosion inhibitor at concentrations of less than 10 parts per million as based on the total liquid present.

It will be readily apparent to those skilled in the art that a wide variety of related amino-hydroxy higher alkylnitriles may be prepared by varying the amine reactant without departing from the spirit and scope of the present invention.

The embodiments of the invention in which an exclusive property or privilege is claimed are defined as follows:

1. An amino hydroxy higher alkylnitrile having the formula RCN in which R is an aliphatic hydrocarbon group containing 8–24 carbon atoms having attached to at least one of said carbon atoms an —OH group and having adjacent to the —OH substituted carbon atom, a carbon atom having attached thereto a

group where $R_1$ and $R_2$ are members selected from the class consisting of (1) hydrogen, (2) alkyl, (3) aryl, (4) hydroxy alkyl and (5) where

is a heterocyclic ring

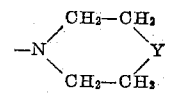

where Y is selected from the group consisting of oxygen, nitrogen, and sulfur.

2. 9-amino-10-hydroxystearonitrile.
3. 10-amino-9-hydroxystearonitrile.
4. 9-dimethylamino-10-hydroxystearonitrile.
5. 10-dimethylamino-9-hydroxystearonitrile.
6. 9-dodecylamino-10-hydroxystearonitrile.
7. 10-dodecylamino-9-hydroxystearonitrile.

8. 9-anilino-10-hydroxystearonitrile.
9. 10-anilino-9-hydroxystearonitrile.
10. 9-morpholino-10-hydroxystearonitrile.
11. 10-morpholino-9-hydroxystearonitrile.
12. 9-β-aminoethylamino-10-hydroxystearonitrile.
13. 10-β-aminoethylamino-9-hydroxystearonitrile.
14. 9-diethanolamino-10-hydroxystearonitrile.
15. 10-diethanolamino-9-hydroxystearonitrile.
16. 9 - meta - aminomethylbenzylamino - 10 - hydroxystearonitrile.
17. 10 - meta-aminomethylbenzylamino - 9-hydroxystearonitrile.
18. 9-methylamino-10-hydroxystearonitrile.
19. 10-methylamino-9-hydroxystearonitrile.
20. 9 - meta-aminophenylamino - 10 - hydroxystearonitrile.
21. 10 - meta-aminophenylamino - 9 - hydroxystearonitrile.

References Cited in the file of this patent

Lutz et al.: Journal of the American Chemical Society, volume 70, page 2019 (1948).

Peracetic Acid and Derivatives (a booklet prepared by the Union Carbide Chemicals Company); copyrighted 1957, by Union Carbide Corporation; pages 12, 16, 18, 19 and 20 relied on.